Feb. 14, 1961  R. L. JAESCHKE  2,971,622
ELECTROMAGNETIC FRICTION CLUTCH
Filed Feb. 4, 1957
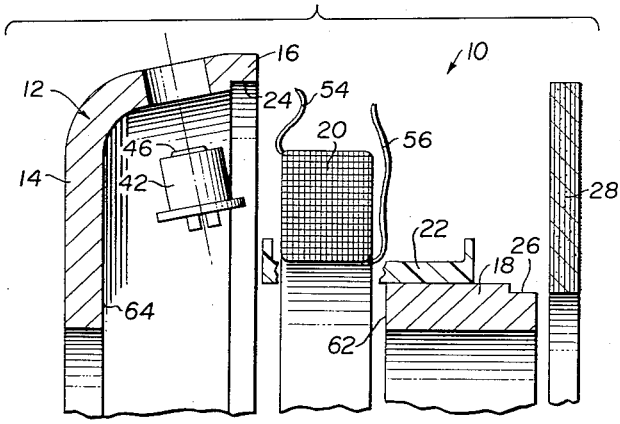
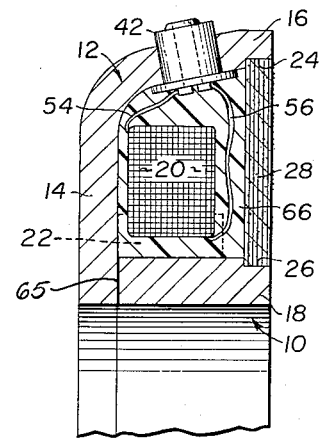
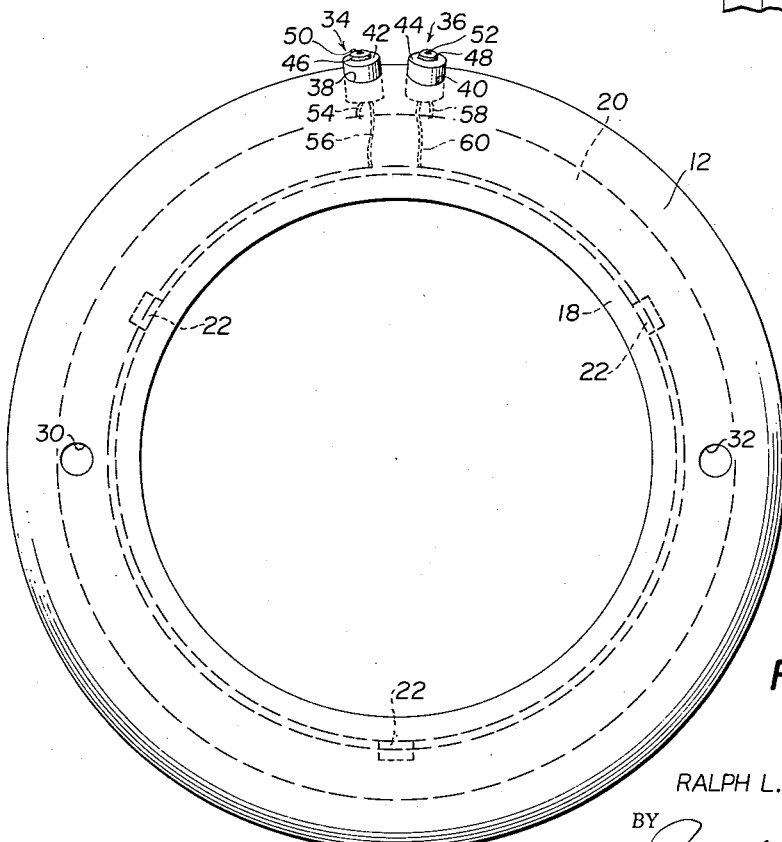
INVENTOR.
RALPH L. JAESCHKE
BY
ATTORNEY

United States Patent Office 2,971,622
Patented Feb. 14, 1961

2,971,622
ELECTROMAGNETIC FRICTION CLUTCH

Ralph L. Jaeschke, Kenosha, Wis., assignor to Eaton Manufacturing Company, Cleveland, Ohio, a corporation of Ohio Filed Feb. 4, 1957, Ser. No. 638,130

2 Claims. (Cl. 192—84)

This invention relates to a novel means of fabricating the friction material, pole pieces, and energizing coil of an electromagnetic friction clutch or brake device. Heretofore these types of devices have been made up of an annular pole piece having a back wall portion and a further portion extending normal to said back wall portion and a second pole piece having an annular ring shape and being disposed radially inward of said further portion and axially coextensive therewith. These two pole pieces were then notched or grooved and welded together to form an integral pole face housing having a U-shaped cross section. Such an arrangement has proved to be very costly in addition to the problem of warpage and distortion caused by the heat of the welding operation.

The novel fabrication method disclosed herein is comprised of the steps of placing two pole pieces of essentially the same shape as the aforementioned pole pieces in an assembled position, inserting suitable plastic clips or spacers within the pole piece assembly, and placing the electrical coil in the assembled position resting on the clips or spacers. The friction wear material is then disposed in the appropriate position, completing the assembly of necessary parts of the clutch structure. One of the pole pieces is provided with a pair of circumferentially spaced holes so that a suitable epoxy resin can be forced into one of the holes and completely filling the void between the pole pieces, coil, and peripheral surfaces of the friction material. When the annular space is filled, resin is forced out the opposite hole indicating that the filling has been completed. The assembly is then allowed to set until the epoxy resin hardens, or heated at an appropriate temperature if a thermo-setting resin is used. The entire structure comprising the two pole pieces, coil, and friction material is bound together by the bond of the epoxy resin with the several components, resulting in a rigid, simple, and inexpensive fabricated structure.

It is an object of this invention to provide a simple and efficient method of fabricating an electromagnetic clutch structure.

A further object is to fabricate an electromagnetic structure which is free of welded joints.

These and other objects and advantages will become more apparent from the following detailed description of the device and from the accompanying drawings wherein:

Figure 1 is an exploded view of the assembly disclosed herein.

Figure 2 is an assembled view of the structure shown in Figure 1 and,

Figure 3 is a rear view of the assembly disclosed herein.

Referring to the drawing for a more detailed description of the device, Figure 1 illustrates a coil housing assembly 10 having a pole piece 12 comprised of a portion 14 disposed in a plane substantially normal to the axis of rotation of the coil housing assembly and a portion 16. The drawing illustrates portion 16 being frustro-conical in shape and it is to be understood that the invention is not limited to such a configuration and that this portion of the pole housing can be disposed at any angle which provides a coil enclosing pole piece. A pole piece 18 is disposed radially inward from pole piece portion 16 and is of a sleeve configuration located coaxially with pole piece portion 16. An annular electrical coil 20 is disposed radially between pole piece portion 16 and pole piece 18 and axially intermediate the axial end faces of pole piece 18. During assembly of the coil housing, the structure is in a position such that portion 14 of pole piece 12 is disposed horizontally and coil 20 is adapted to be held in a spaced assembling position by epoxy resin spacers or insulator clips 22 which are located in axially overlapping relation to coil 20 and disposed radially between coil 20 and pole piece 18. An annular ring or disc of friction material 28 is positioned substantially parallel to portion 14 of pole piece 12 and axially coextensive with the open end faces of pole piece portion 16 and pole piece 18. Pole piece portion 16 is provided with a pair of circumferentially spaced holes 30 and 32, respectively, for a purpose hereinafter described.

Suitable coil connecting means 34 and 36 are receivable in circumferentially spaced holes 38 and 40 and comprise nylon insulator sleeves 42 and 44 having brass insert sleeves 46 and 48 disposed therein. Brass screws 50 and 52 are threaded into brass insert sleeves 46 and 48 respectively, and have soldered thereto wires 54, 56, 58, and 60, respectively, which are in turn connected to coil 20 to provide a means to carry current to the coil. The specific details of these coil connections form no part of the present invention but are illustrated merely to show one convenient means of providing a coil connection.

When the above mentioned components have been positioned for assembly, a suitable plate or retaining means can be positioned over the friction material 28 merely for purposes of assembly. Pole pieces 12 and 18 are maintained in an assembled relationship due to the abutment or surface 62 of pole piece 18 against surface 64 of pole piece 12. It is to be noted that a shim 65 of several thousandths of an inch thickness of non-magnetic material can be interposed between surfaces 62 and 64 when the housing is being fabricated or pole pieces 12 and 18 can be held in a fixture so that there is a uniform clearance of several thousandths of an inch between surfaces 62 and 64. The purpose of such an air gap is to reduce the residual magnetism present in the circuit. When the coil housing is assembled as heretofore described, a suitable nozzle is inserted in hole 30 to discharge an epoxy resin material 66 in the void between coil 20, pole pieces 12 and 18 and friction material 28. When a sufficient amount of resin has been deposited within the housing, the excess deposit flows out through hole 32 which indicates that the enclosure is completely filled. As heretofore mentioned, the resin can be of a variety which hardens at room temperatures or which requires elevated temperatures to set the material. After the resin hardens, the excess is trimmed away from around holes 30 and 32. The bond between the epoxy resin and pole pieces 12, 18 and friction material 28 is relied upon to maintain the elements in a unitary assembled structure.

It is obvious from the foregoing description that a very strong and simply constructed coil housing is provided which requires no welded, bolted, or riveted joints and wherein the bond between epoxy resin or other suitable plastic material and the components of the coil housing is relied upon to maintain the structure as a unitary assembly.

While the present invention has been described in connection with certain specific embodiments, it is to be understood that the foregoing description is merely exemplary and that the concept of this invention is susceptible of numerous other modifications, variations, and applications which will be apparent to persons skilled in the art. The invention is to be limited, therefore, only by the broad scope of the appended claims.

What I claim is:

1. An electromagnetic clutch structure comprising a magnetic pole housing having a sleeve shaped pole piece, a first annular pole piece portion positioned substantially normal to the axis of said sleeve shaped pole piece and being axially spaced from an end surface of said sleeve shaped pole piece to form an anti-residual gap between said sleeve shaped pole piece and said pole piece portion, a second annular pole piece portion integral with and disposed at an angle to said first pole piece portion and being substantially axially coextensive with said sleeve shaped pole piece, an annular energizing coil disposed radially between said sleeve shaped pole piece and said second annular pole piece portion and axially intermediate thereof, an annularly disposed friction material means positioned axially remote from said first pole piece portion and lying in a plane normal to the axis of said sleeve shaped pole piece, and resin bonding material completely filling the volume defined by said sleeve shaped pole piece and said pole piece portions and said friction material and being in bond contacting relationship with said sleeve shaped pole piece and said pole piece portions and said friction material throughout the entire lateral surface of said volume to bond said pole pieces and said friction material into a unitary structure.

2. An annular electromagnetic clutch structure comprising an annular pole piece having a pole piece portion disposed in a plane normal to the axis of said annular structure, a sleeve shaped pole piece disposed adjacent said first mentioned pole piece and slightly axially spaced therefrom, a further pole piece portion integral with said first mentioned pole piece portion and being substantially axially coextensive with said sleeve shaped pole piece and radially spaced therefrom, friction material means disposed substantially normal to the axis of said annular structure and terminating radially coextensive with said sleeve shaped pole piece and being disposed axially adjacent thereto, said pole pieces and said friction material forming an annular enclosure of a polygonal cross-sectional shape, energizing coil means disposed within said annular enclosure and a plastic material means filling said annular enclosure and being in bond contacting relationship with the annular surface portions of said pole pieces and said friction material which define said annular enclosure to bond said pole pieces, energizing coil, and said friction material into a unitary assembled structure.

References Cited in the file of this patent

UNITED STATES PATENTS

| | | |
|---|---|---|
| 2,334,584 | Rich | Nov. 16, 1943 |
| 2,347,873 | Bloomfield | May 2, 1944 |
| 2,351,598 | Cadman | June 20, 1944 |
| 2,353,750 | Oetzel | July 18, 1944 |
| 2,395,772 | Winther | Feb. 26, 1946 |
| 2,690,819 | Meyer | Oct. 5, 1954 |
| 2,739,684 | Meyer | Mar. 27, 1956 |
| 2,787,824 | Kaczor | Apr. 9, 1957 |
| 2,820,914 | Rudoff et al. | Jan. 21, 1958 |

OTHER REFERENCES

"Polymer Processes" (Schildknecht), published by Interscience Publishers Inc. (New York), pp. 429–474.